United States Patent [19]

Cramer et al.

[11] 4,018,611
[45] Apr. 19, 1977

[54] NON-YELLOWING ANTIMICROBIAL COMPOSITIONS COMPRISING DIIODOMETHYL SULFONES

[75] Inventors: Charles Robert Cramer, Vaduz, Liechtenstein; Gerrit Dirk vanLenthe; Dietmar Maier, both of Grabs, Switzerland

[73] Assignee: Metalorgana Etablissement, Vaduz, Liechtenstein

[22] Filed: Sept. 15, 1975

[21] Appl. No.: 613,564

[30] Foreign Application Priority Data

Sept. 17, 1974 Switzerland ............... 12588/74

[52] U.S. Cl. ............... 106/15 R; 106/111; 260/29.6 MQ; 260/29.6 MN; 424/175; 424/286; 424/289; 424/3 28; 424/337

[51] Int. Cl.² ............................... C09D 5/14

[58] Field of Search ......... 106/15 R, 111; 424/175, 424/286, 328, 337, 289; 260/607 A, 29.6 MQ, 29.6 MN

[56] References Cited

UNITED STATES PATENTS

| | | | |
|---|---|---|---|
| 2,720,482 | 10/1955 | Bryan et al. | 424/175 |
| 3,615,745 | 10/1971 | Crovetti et al. | 106/15 AF |
| 3,632,859 | 1/1972 | Crovetti | 424/337 |
| 3,657,353 | 4/1972 | Crovetti et al. | 424/337 |
| 3,781,423 | 12/1973 | Aoka et al. | 424/175 |
| 3,836,643 | 9/1974 | Hennart | 424/175 |
| 3,901,935 | 8/1975 | Domenico | 106/15 AF |

*Primary Examiner*—Lorenzo B. Hayes
*Attorney, Agent, or Firm*—Cushman, Darby & Cushman

[57] ABSTRACT

There is provided an antimicrobial composition comprising a diiodomethyl sulfone of the formula $R(CH_2)_nSO_2CHI_2$, wherein $n$ is an integer from 0 to 4 and R is selected from the group alkyl, cycloalkyl, phenyl, naphthyl, loweralkylphenyl, polyloweralkylphenyl, lower-alkoxyphenyl, monohalophenyl, polyhalophenyl, haloloweralkylphenyl halonitrophenyl, nitrophenyl, nitroloweralkylphenyl, anilino, anilinophenyl, and anilamidophenyl and in order to prevent the yellowing and/or the discoloring of the diiodomethyl sulfone a compound containing a reactive sulfide or sulfhydryl group. If the compound containing a reactive sulfide or sulhydryl group is a dithiocarbamate the composition shows an increased antimicrobial activity. The method of protecting potential natural or industrial host materials against attack by micro-organisms, in particular bacteria, algae and fungi, comprising treating said host material with said diiodomethyl sulfone and with said compound containing a reactive sulfide or sulfhydryl group or incorporating said compounds therein is also disclosed.

37 Claims, No Drawings

NON-YELLOWING ANTIMICROBIAL COMPOSITIONS COMPRISING DIIODOMETHYL SULFONES

BACKGROUND OF THE INVENTION

The invention relates to non-yellowing and non-coloring biocidal compositions used in or on industrial and natural products to prevent attack by micro-organisms, in particular algae, fungi and bacteria; such industrial or natural products are e.g. paint and lacquer films, plasters, adhesives, glues, leather, textiles, natural fibers, etc. The invention relates more particularly to antimicrobial compositions of synergistic increased activity to protect colorless, white or pale-colored substrates and coating materials where yellowing, discoloring or color changes are not acceptable.

It is known e.g. from the U.S. Pat. Nos. 3,615,745 (Oct. 26, 1971), 3,663,623 (May 16, 1972), 3,792,091 (Feb. 12, 1974) and 3,806,351 (Apr. 23, 1974) that diiodomethyl sulfones of the formula (I) $R(CH_2)_nSO_2CHI_2$, wherein $n$ is an integer from 0 to 4 and R is selected from the group alkyl, cycloalkyl, phenyl, naphthyl, loweralkylphenyl, polyloweralkylphenyl, loweralkoxyphenyl, monohalophenyl, polyhalophenyl, haloloweralkylphenyl, halonitrophenyl, nitrophenyl, nitroloweralkylphenyl, anilino, anilinophenyl, and anilamidophenyl, exhibit good antimicrobial activity. Said diiodomethyl sulfones have been proposed for the production or coating of materials as mentioned above. The entire disclosures of the four above mentioned United States patents are hereby incorporated by reference and relied upon.

However, in practical use the compositions have the serious draw-back that the diiodomethyl sulfones are yellowing and produce discoloring effects on the materials to be protected, though the diiodomethyl sulfones themselves can be colorless.

It was not possible to determine the chemical reaction causing the yellowing of the diiodomethyl sulfones. While said yellowing occurs even in the absence of any light or other environmental factors, the yellowing is enhanced by light, temperature and the influence of weather conditions. It is assumed that the yellowing and discoloring is caused by a degradation mechanism of the diiodomethyl sulfone which is initiated and/or accelerated by a variety of factors including light, heat and substances contained in the natural or industrial host materials to be protected against the attack of micro-organisms.

Due to the serious draw-back of yellowing, antimicrobial compositions comprising diiodomethyl sulfones were not applicable to protect colorless, white or pale-colored host materials and coatings against the attack of micro-organisms. The application of antimicrobial compositions comprising diiodomethyl sulfones were restricted to the rare cases where the yellowing or discoloring was acceptable, e.g. to protect viable seed potential hosts or in paints having a rather dark inherent color.

There is another group of chemical compounds exhibiting good biocidal, in particular fungicidal properties, viz. derivatives of the dithiocarbamic acids having the general formula II:

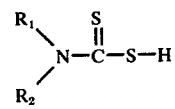

wherein $R_1$ and $R_2$ represent organic radicals, and the esters and salts of said dithiocarbamic acid, which compounds are generally referred to as "dithiocarbamates". Said dithiocarbamates have found a widespread use as agricultural fungicides. It is known that dithiocarbamates form strongly colored complexes with heavy metal ions. When using dithiocarbamates as fungicides, e.g. in white or pale-colored paints and coatings, there is always the risk of color formation because of substrates in coating materials containing traces of heavy metals as impurities.

It is an object of this invention to provide a non-yellowing and non-coloring composition comprising diiodomethyl sulfones to protect potential natural and industrial host materials against the attack of micro-organisms, in particular bacteria, algae and fungi.

It is another object of this invention to provide a non-coloring antimicrobial composition comprising diiodomethyl sulfones having enhanced antimicrobial activity.

It is a further object of this invention to provide a method of protecting potential natural or industrial host material against attack by micro-organisms, in particular bacteria, algae and fungi comprising treating said host material with diiodomethyl sulfones and preventing the yellowing and discoloring effect of the diiodomethyl sulfones. It is still another object of this invention to provide a composition which will protect painted surfaces, plasters and textiles against the attack by micro-organisms, in particular bacteria, algae and fungi.

These and other objects which will become apparent from the following description and examples are attained through the provision of an antimicrobial composition comprising a diiodomethylsulfone of the formula (I) $R(CH_2)_nSO_2CHI_2$, wherein $n$ is an integer from 0 to 4 and R is selected from the group alkyl, cycloalkyl, phenyl, naphthyl, loweralkylphenyl, polyloweralkylphenyl, loweralkoxyphenyl, monohalophenyl, polyhalophenyl, haloloweralkylphenyl, halonitrophenyl, nitrophenyl, nitroloweralkylphenyl, anilino, anilinophenyl, and anilamidophenyl, and to prevent the yellowing and/or the discoloring of the diiodomethyl sulfone a compound containing a reactive sulfide or sulfhydryl group.

The term "loweralkyl" is intended to include those substituents having from 1 to 7 carbon atoms, preferably from 1 to 4 carbon atoms.

Examples of compound within formula (I) are 4-chlorophenyl diiodomethyl sulfone, p-tolyldiiodomethyl sulfone, phenyl-diiodomethyl sulfone, 4-t-butylphenyl diiodomethyl sulfone, 3,4-dichlorophenyl diiodomethyl sulfone, 4-methoxybenzyl diiodomethyl sulfone, n-octyldiiodomethyl sulfone, 2-nitro-4-chlorophenyl-diiodomethyl sulfone, 2-nitro-4-methylphenyl-diiodomethyl sulfone, 4-bromophenyl diiodomethyl sulfone, 2-methyl-4-p-t-butylphenyl diiodomethyl sulfone, p-anisyl diiodomethyl sulfone, 2-naphthyl diiodomethyl sulfone, 1-naphthyl diiodomethyl sulfone, 2-methyl-4-chlorophenyl diiodomethyl sulfone, 3,4-dimethylphenyl diiodomethyl sulfone, ethyl diiodomethyl sulfone, 4-fluorophenyl diiodomethyl sulfone, 4-iodophenyl diiodomethyl sulfone, 3,4-dibromophenyl diiodomethyl sulfone, 3-chloro-4-bromophenyl diiodomethyl sulfone, 2,4,5-trichlorophenyl diiodomethyl sulfone, cyclopentyl diiodomethyl sulfone, p-methylcyclohexyl diiodomethyl sulfone, butyl diiodomethyl sulfone, amyl diiodomethyl sulfone, p-heptylphenyl diiodomethyl sulfone, 2,4-diethylphenyl diiodomethyl sulfone, 2-methyl-4-chlorophenyl diiodomethyl sulfone, 2-chloro-4-butylphenyl diiodomethyl sulfone, 3-nitrophenyl diiodomethyl sulfone, benzyl diiodomethyl sulfone, phenethyl diiodomethyl sulfone, phenylbutyl diiodomethyl sulfone, p-aminophenyl diiodomethyl sulfone, p-aminodiphenyl diiodomethyl sulfone, 2,4-difluorophenyl diiodomethyl sulfone, 4-ethoxyphenyl diiodomethyl sulfone, 4-butoxyphenyl diiodomethyl sulfone, anilamidophenyl diiodomethyl sulfone, 4-(methylamido)-phenyl diiodomethyl sulfone, n-heptyl diiodomethyl sulfone, 3-tolyl diiodomethyl sulfone, 2-tolyl diiodomethyl sulfone, 2-methyl-4-bromophenyl diiodomethyl sulfone, 3-methyl-4-bromophenyl diiodomethyl sulfone, 2,4-dimethylphenyl diiodomethyl sulfone, t-butyl diiodomethyl sulfone, 2-methyl-4-butylphenyl diiodomethyl sulfone, 4-chlorobenzyl diiodomethyl sulfone, 4-nitrophenyl diiodomethyl sulfone, 2-isopropylphenyl diiodomethyl sulfone, cyclohexyl diiodomethyl sulfone, 4-methylbenzyl diiodomethyl sulfone, n-hexyl diiodomethyl sulfone, n-propyl diiodomethyl sulfone, 4-bromobenzyl diiodomethyl sulfone, 4-methoxybenzyl diiodomethyl sulfone, 3-chlorobenzyl diioclomethyl sulfone, 3-bromobenzyl diiodomethyl sulfone, 2-naphthylmethyl diiodomethyl sulfone, 1-phenyl-3-(diiodomethylsulfonyl) propane, isobutyl diiodomethyl sulfone, 3,4-dimethylbenzyl diiodomethyl sulfone, 3,3-dimethylpropyl diiodomethyl sulfone, 2,2,4,4-tetramethylbutyl diiodomethyl sulfone.

According to a preferred embodiment of the invention, the antimicrobial composition comprises a compound containing a reactive sulfide or sulfhydryl group a compound having the general formula III, $R^9$—S—X, wherein X is selected from the group consisting of hydrogen, $R^9$—S— and $R^9$—, and $R^9$ is selected from the group consisting of hydrogen, an equivalent of a metal, e.g. sodium, potassium, zinc, manganese, calcium, zirconium, magnesium, iron, and an organic radical.

According to a particularly preferred embodiment of the invention the antimicrobial composition comprises a diiodomethyl sulfone of the formula $R(CH_2)_nSO_2$-$CHI_2$, wherein n and R have the meaning set forth above and as a compound to prevent the yellowing and the discoloring of the diiodomethyl sulfone and to impart enhanced activity against microorganisms to the composition a dithiocarbamate having the following general formula IV:

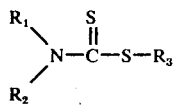

(IV)

wherein $R_1$ is selected from the group consisting of hydrogen and lower alkyl, e.g. methyl, ethyl, propyl, isopropyl, sec. butyl, butyl, t-butyl, amyl, hexyl, heptyl, $R_2$ is selected from the group consisting of hydrogen, lower alkyl, as just set forth a residue of the general formula IV a:

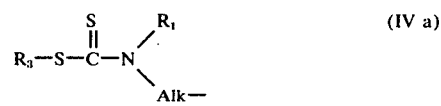

(IV a)

wherein Alk represents an alkylene group having 1 to 6, preferably 2 to 3, carbon atoms and a residue of the formula V:

(V)

wherein $R_6$ is selected from the group consisting of hydrogen, loweralkyl and hydroxyloweralkyl and $R_7$ is selected from the group consisting of hydrogen, loweralkyl and hydroxyloweralkyl or wherein $R_1$ and $R_2$ together with the nitrogen atom to which they are attached form a heterocyclic ring having 4 to 6 carbon atoms, and $R_3$ is selected from the group consisting of hydrogen, an equivalent of a metal atom such as those set forth above a group $R_8$—, $R_8CH_2$— or $R_8$—S—, wherein $R_8$ is an organic radical, preferably the group

(VI)

wherein $R_1$ and $R_2$ have the same meaning as above, wherein $R_3$ and $R_7$ together represent an optionally substituted methylene bridge.

Representative compounds containing at least one reactive sulfide or sulfhydryl group to be combined with the above diiodomethyl sulfones include zinc sulfide, lithopones, (a technical product containing zinc sulfide and barium sulfate), higheralkylmercaptides, thioglycolic acid and its esters thiopropionic acid and its esters thioureas, thiophenyls and dithiocarbamates.

Among the higher alkyl mercaptides and mercaptans are sodium octyl mercaptide, sodium decyl mercaptide, sodium dodecyl mercaptide, sodium octadecyl mercaptide, sodium eicosanyl mercaptide, potassium hexadecyl mercaptide, zinc octadecyl mercaptide, ferric mercaptide, octyl mercaptan, lauryl mercaptan, cetyl mercaptan, octadecyl mercaptan. Ester of thioglycolic acid and thiopropionic acid include methyl thioglycolate, ethyl thioglycolate, butyl thioglycolate, octyl thioglycolate, 2-ethylhexyl thiopropionate, octadecyl thioproponate, 2-ethyl hexyl thioglycolate, octadecyl thioglycolate. Thioureas include thiourea itself, methyl thiourea, ethyl thiourea, 1,3-diethyl thiourea, trimethyl thiourea, butyl thiourea. Thiophenols include thiophenol itself, p-methylthiophenol and thionaphthol.

Representative dithiocarbamates showing synergistic increase of activity in combination with diiodomethyl sulfones are listed in Table I.

Other dithiocarbamates include disodium-ethylene-bis-dithiocarbamate, ferric dimethyldithiocarbamate, zinc-N,N-diethyl dithiocarbamate, sodium-N,N-dibutyl dithiocarbamate, zinc-N,N'-hexamethylene-1,6-bis(dithiocarbamate), sodium-N,N'-tetramethylene-1,4-bis(- dithiocarbamate), sodium-N-[N'-bis(hydroxymethyl)-aminomethyl]-N-methyl dithiocarbamate, zinc N-methyl, N-heptyl dithiocarbamate, tetraethyl thiuram disulfide, sodium N-methyl dithiocarbamate, sodium salt of 1-piperidinecarbodithioic acid, zinc salt of pyrrolidinecarbodithioic acid, 4-morpholinecarbodithioic acid-2-hydroxyethylester, disodiumpiperazine-bis-(dithiocarbamate), ethylenethiuram monosulfide, carbethoxydimethyldithiocarbamate, 2,4dinitrophenyl-N,N-dimethyldithiocarbamate, S-phenylacyl-N,N-dimethyldithiocarbamate, S-(4-nitrobenzoyl)-N,N-dimethyldithiocarbamate, S-(1-methyl-1-carboxyethyl)-pyrroline-N-carbodithioate, S-carbomethoxy-N,N-dimethyldithiocarbamate, S-ethyl-N,N-dimethyldithiocarbamate, S-acetonyl-N,N-dimethyldithiocarbamate, S-(2-isonitrosopropyl)-N,N-dimethyldithiocarbamate, S-cyanomethyl-N,N-dimethyldithiocarbamate, ethoxycarbonyl-2,4,4-trimethyltetramethylenedithiocarbamate, di-n-butoxycarbonyl-2,5-dimethylpiperatine-1,4-biscarbodithionate, isopropoxycarbonyltetramethylenedithiocarbamate, N-methyl-N-phenyldithiocarbamic acid acetic acid ester, diethyldithiocarbamic acid 2-hydroxyethyl ester, ethylenethiuramidisulfide.

Considering the materials in Table I each compound 1 to 10 may be combined with each compound A to L. It is obvious from the above that any other diiodomethyl sulfone comprised by the formula I can be combined with any other compound containing a reactive sulfide or sulfhydryl group.

TABLE I

| (1) (4-chlorophenyl-diiodomethyl sulfone | (A) Na-N,N-dimethyl-dithiocarbamate |
|---|---|
| (2) 4-tolyl-diiodomethyl sulfone | (B) zinc-N,N'-ethylene-bis-(dithiocarbamate) |
| (3) phenyl-diiodomethyl sulfone | (C) tetramethyl-triuramedisulfide |
| (4) 4-tert.-butylphenyl-diiodomethyl sulfone | (D) zinc-N,N'-propylene-1,2-bis-(dithiocarbamate) |
| (5) 3,4-dichlorophenyl-diiodomethyl sulfone | (E) 3,5-dimethyl-1,3,5-2H-tetrahydro-thiadiazine-2-thione |
| (6) cyclohexyldiiodomethyl sulfone | (F) S,S'-di-(methylxanthogenyl)-ethylene-bis-(dithiocarbamate) |
| (7) 4-methoxybenzyl-diiodomethyl sulfone | (G) zinc-N,N-dimethyldithio-carbamate |
| (8) n-octyl-diiodomethyl sulfone | (H) manganese-N,N'-ethylene-bis-dithiocarbamate |
| (9) 2-nitro-4-chloro-phenyldiiodomethyl sulfone | (I) S-benzyl-N,N-dimethyl-dithiocarbamate |
| (10) 2-nitro-4-methyl-phenyldiiodomethyl sulfone | (K) carbethoxytetramethylene-dithiocarbamate |
|  | (L) sodium-N-[N'-methyl-N'-hydroxymethyl-aminomethylene]-N-methyldithiocarbamate |

Depending on the compounds used the proportion between diiodomethyl sulfones (a) and the compounds (b) containing a reactive sulfide or sulfhydryl group may vary; said proportion is preferably expressed in molar equivalent ratios (a:b). Although a small amount of the compound containing a reactive sulfide or sulfhydryl group is sufficient to considerably reduce the discoloring effect of diiodomethyl sulfones, the best effects are obtained within a molar equivalent ratio of 1 mol (a): 0.5–4 moles (b), particularly good results are usually found at molar equivalent ratios of 1 mole (a): 1.8 – 2.4 moles (b), or preferably by using a molar equivalent ratio of approximately 1:2.

The compounds (a) and (b) can either be premixed and then incorporated into a coating composition or (a) and (b) can be added separately at various stages of preparing the coating composition. In cases where the compounds are soluble in a solvent compatible with the coating compositions, the compounds can be dissolved in the solvent and the obtained solution can be added to the finished coating composition, e.g. a latex paint, simply by mixing the solution with the coating composition. In cases where no solvent compatible with the coating compositions can be found, it is preferable to prepare a paste of compounds (a) and (b) and incorporating said paste (e.g. simply by stirring) into the coating compositions.

The total quantity of compounds (a and b) employed and the concentration at which the mixture is applied to protect potential host materials varies with the application, the degree of protection required, and can also be dictated by economic considerations. Normally, quantities ranging from 0.05 to 2 percent by weight are used in coating compositions such as paints, plasters, adhesives, leather and textile finishings and sprays.

The following examples are only illustrative of preferred embodiments of the invention and are not to be regarded as limitative. All parts and proportions referred to herein and in the appended claims are by weight unless otherwise indicated.

EXAMPLE I 4.42 grams (0.01 mole) of 4 chlorophenyl diiodomethylsulfone having an M.P. of 136° C. were simultaneously mixed and ground with 1.95 grams (0.02 mole) of pure zinc sulfide in a 100 ml ball mill for 30 minutes. There was obtained a fine, light yellow powder.

EXAMPLE II 4.44 grams (0.01 mole) of n-octyl-diiodomethyl sulfone having an M.P. of 73° C. were dissolved in 15 grams of acetone and treated with 4.08 grams (0.02 mole) of 2-ethylhexyl thioglycolate. Upon the addition of the thioglycolic acid esters there was observed a lightening of the diiodomethyl sulfone solution. There was obtained a 36.22% solution.

Examples 1A, 1B, 1C below illustrate the antiyellowing behavior of such antimicrobial compositions in 3 typical coating materials, a white exterior latex paint (A), a white interior type (B) and a pale-colored outdoor plaster (C).

EXAMPLE 1A

A white latex exterior paint was prepared according to the following recipe.

| | |
|---|---|
| Acrylic copolymer (Primal AC 34, Rohm & Haas) (50 percent in water) | 44 parts |
| Titanium dioxide (RN 61, Kronos Titan, BRD) | 22 parts |
| Magnesium silicate (Talcum, Naintsch,A) | 3 parts |
| Calcium carbonate (Omya BLP-2, Omya, BRD) | 16 parts |
| Water | 13 parts |
| Methylcellulose (Tylose MH 1500, Hoechst BRD) | 0.2 parts |
| Sodium polyphosphate (Calgon N, Benkiser-Knapsack, BRD) | 0.1 parts |
| Ethyleneglycol acetate (Oxitol-Acetate, Shell, CH) | 1.5 parts |
| Ammonia (25 percent by weight) | 0.2 parts |
| | 100.0 parts |

100 gram samples of this paint were succeedingly placed in a Molteni Dissolver machine and to each sample were added 2 percent (2 grams) of the diiodomethyl sulfone test substances (a) and the corresponding amount of reactive sulfide or sulfhydryl containing substances (b) listed in Test Nos. 1 to 16 of Table II, and representing a molar equivalent ratio of 1 mole (a):2 mole equivalents (b).

In this experiment the compounds were added separately and dispersed equally in the paint by intensive stirring with the dissolver during 5 minutes. For comparison nine paint samples, containing only the diiodomethyl sulfones (a) in the same amount of 2 percent (2 grams) were prepared in the same manner (cf. Test Nos. 17–25 of Table II). A blank, containing neither (a) nor (b) was also included in the series (Test No. 26 of Table II).

In this experiment the dosage of compounds (a) and (b) as well as (a) alone was purposely chosen above the normal range, necessary for antimicrobial protection, in order to make the yellowing differences more visible.

From each latex paint sample Nos. 1 – 26 containing the compounds (a) and (b) or (a) alone, evently dispersed, including the blank, test plates were made in the following manner.

A paint film was applied to a freshly cleaned and degreased glass plate (10 × 30 cm), using a film applicator at a wet film thickness of 200 μ (7.88 mil). The glass plates were then left in a dark room to dry for 2 weeks at room temperature. The test plates were then fixed to a test rack at a 45° angle, facing south, and exposed to open air direct weathering. The test plates were inspected after 2 and 4 months for color change and evaluated according to the following scale.

0    no yellowing
+    very slight yellowing (just visible)
++   slight yellowing
+++  medium yellowing
++++ strong and very strong yellowing The results are contained in Column I of Table II.

| | |
|---|---|
| Polyvinylacetate copolymer (Mowilith DV02 ST, Hoechst BRD) (50 percent in water) | 25 parts |
| Titanium dioxide (Rutile type) (RN 61, Kronos Titan BRD) | 20 parts |
| Calcium carbonate (Omya BLP 2, Omya BRD) | 14 parts |
| Magnesium silicate (Talcum, Naintsch,A) | 14 parts |
| Water | 25 parts |
| Hydroxyethylcellulose Natrosl 250 MR, Hercules USA) | 0.3 parts |
| Sodiumhexametaphosphate (Siegried, CH) | 0.1 parts |
| Ethyleneglycol (Shell, CH) | 1.5 parts |
| Ammonia (25 percent by weight) | 0.1 parts |
| | 100.0 parts |

To 100 gram samples of this paint were added the same amount of the same test compounds (a) and (b) Nos. 1 to 16 in Table II and for comparison reasons the same diiodomethyl sulfone test compounds (a) alone (Nos. 17–25 Table II) in the same manner as in the same Molteni machine as described in Example 1A.

The test plates were prepared, dried and exposed exactly in the same way as described in Example 1A and also evaluated after 2 and 4 months on the same yellowing scale. Again a blank paint sample containing neither compound (a) nor (b) was included in this experiment (No. 26, Table II). The results are listed in Column II of Table II.

EXAMPLE 1C

A non-pigmented decorative latex wall plaster for exterior use, was prepared according to the following recipe:

| | |
|---|---|
| Styrenated acrylate copolymer (Acronal 290D, BASF BRD) (50 percent in water) | 15 parts |
| Methylcellulose (Tylose MH 1500, Hoechst BRD) | 0.1 parts |
| Water | 3.9 parts |
| 2,2,4-trimethyl-1,3-pentanediol monoisobutyrate (Texanol, Eastman Chemical) | 0.8 parts |
| Natural stone granulate (natural decorative silicates and quartz granules, Zimmerli, CH) | 80.2 parts |
| | 100.0 parts |

However, in this experiment the test compounds were not added to the finished plaster but incorporated in the following manner in order to facilitate uniform dispersion.

The binder composition, containing all ingredients of the recipe except for the natural stone granulate, was first prepared.

To 39.6 gram samples of this binder mixture were then again added the test compounds (a) and (b). Nos. 1 to 16, Table II, and the compounds (a) alone, Nos. 17 to 25, Table II, in amounts such as to yield the same end concentration in the finished plaster as in Example 1A and 1B and indicated in Table II. This means that the added amounts of test compounds to the binder mixture had to be chosen 5.05 times the percentage in order to obtain the indicated end concentration.

Addition was performed in exactly the same manner as described in Example 1A.

Finally, 160.4 grams of the natural stone granulate was added to each sample and mixed at reduced stirring speed for another 5 minutes.

A blank, containing no compound (a) nor (b) was made up the same way and included in this test series, No. 26, Table II.

Concrete plates, measuring 40 × 40 cm, 5 cm thick, primed with one brush coat of a 25 percent by weight dispersion of Primal AC 34 acrylate binder, were used as test plates.

The decorative latex plaster samples were then applied to the surface of the concrete test plates by drawing up the plaster, using a stainless steel trowel. After drying for 2 weeks in a dark room the plates were then mounted onto a test rack at a 45° angle, facing south, and left to open air weathering. Inspection and evaluation after 2 and 4 months was made as described in Example 1A. The results are contained in Column III of Table II.

Table II shows that all compounds (b) exert an anti-yellowing effect on the diiodomethyl sulfones when comparing the results with those of the corresponding diiodomethyl sulfones alone. Furthermore, it can be seen that particularly compounds belonging to the group of dithiocarbamates show good to excellent anti-yellowing effects, especially over the longer weathering period.

The following Examples 2A and 2B illustrate the effect of varying the molar equivalent ratios of the two compounds (a) and (b) on anti-yellowing behaviour, using 4-tolyldiiodomethyl sulfone as (a) and Zn-N,N-dimethyldithiocarbamate as (b) and as coating materials a white exterior paint (A) and a pale-colored plaster (B).

EXAMPLE 2A 4.22 grams (0.01 mole) of 4-tolyldiiodomethyl sulfone, mp. 148° C. and 3.05 grams (0.01 mole or 0.02 mole equivalents of reactive sulfide groups) of zinc-N,N-dimethyldithiocarbamate were placed in an agate mortar and finely ground. Then 4 grams of distilled water containing 0.5% (0.02 g) of an ethoxylated nonylphenol as a wetting agent (Inventin N 35 Kolb CH) were slowly added to form a paste, containing 64.39 percent of total active material, and containing the two components in a molar equivalent ratio of 1:2.

In the same manner, pastes were made of different molar equivalent ratios with 4-tolyldiiodomethyl sulfone (a) and zinc-N,N-dimethyldithiocarbamate (b) using the amounts of water with 0.5 percent wetting agent (c) as shown in Table III.

TABLE II

Comparative yellowing effects.

| no. | (a) R-diiodomethyl-sulfone | % | (b) reactive sulfide or sulfhydryl-containing substances | % | I exterior paint example 1 A after 2 mths | 4 mths | II interior paint example 1 B after 2 mths | 4 mths | III plaster example 1 C after 2 mths | 4 mths |
|---|---|---|---|---|---|---|---|---|---|---|
| 1 | 4-chlorophenyl[1] | 2 | ZnS (Lithopone 60 %) | 1.47 | ++ | +++ | + | ++ | + | +++ |
| 2 | n-octyl | 2 | thioglycolic acid-2-ethyl-hexylester | 1.84 | +++ | ++++ | +++ | ++++ | +++ | ++++ |
| 3 | 4-tolyl[1] | 2 | Zn-N,N-dimethyldithiocarbamate[6] | 1.45 | 0 | 0 | 0 | 0 | 0 | + |
| 4 | 4-tolyl | 2 | thiodipropionic acidbislaurylester[6] | 4.88 | ++ | ++++ | + | +++ | +++ | ++++ |
| 5 | 4-chlorophenyl | 2 | Na-N,N-dimethyldithiocarbamate[6] | 1.62 | + | +++ | 0 | +++ | + | ++++ |
| 6 | 4-tert-butylphenyl- | 2 | thiourea[6] | 0.66 | +++ | ++++ | ++ | ++++ | +++ | ++++ |
| 7 | 4-chlorophenyl | 2 | 3.5-dimethyl-1.3.5-2H-tetra-hydrothiadiazine-2-thione[4] | 1.47 | 0 | 0 | 0 | 0 | 0 | 0 |
| 8 | 3,4-dichlorophenyl- | 2 | S-benzyl-N,N-dimethyldithiocarbamate | 1.77 | 0 | + | 0 | 0 | + | ++ |
| 9 | 4-chlorophenyl- | 2 | Zn-N,N'-ethylene-bisdithiocarbamate[3] | 1.25 | + | ++ | 0 | + | + | ++ |
| 10 | cyclohexyl- | 2 | tetramethylthiuramdisulfide[6] | 1.16 | ++ | ++ | + | ++ | ++ | +++ |
| 11 | 4-tolyl- | 2 | 3.5-dimethyl-1.3.5-2H-tetra-hydrothiadiazine-2-thione | 1.54 | 0 | 0 | 0 | 0 | 0 | 0 |
| 12 | phenyl- | 2 | thiophenol[6] | 1.08 | ++ | +++ | + | +++ | +++ | ++++ |
| 13 | 4-chlorophenyl | 2 | S,S'-di(methylxanthogenyl)-ethylenebisdithiocarbamate | 0.96 | + | ++ | 0 | + | ++ | +++ |
| 14 | 4-methoxybenzyl- | 2 | Mn-N,N'-ethylenebisdithiocarbamate[3] | 1.17 | ++ | ++ | + | ++ | +++ | + |
| 15 | 4-tolyl- | 2 | carbethoxy-tetramethylene-dithiocarbamate | 2.08 | 0 | + | 0 | 0 | + | + |
| 16 | 2-nitro-4-methylphenyl- | 2 | laurylmercaptide[6] | 1.68 | ++ | +++ | + | +++ | +++ | ++++ |
| 17 | 4-tolyl- | 2 | — | | +++ | ++++ | ++ | +++ | ++++ | ++++ |
| 18 | 4-chlorophenyl- | 2 | — | | ++++ | ++++ | ++++ | ++++ | ++++ | ++++ |
| 19 | n-octyl- | 2 | — | | ++++ | ++++ | ++++ | ++++ | ++++ | ++++ |
| 20 | 4-tert.-butylphenyl | 2 | — | | ++++ | ++++ | +++ | ++++ | ++++ | ++++ |
| 21 | 3.4-dichlorophenyl- | 2 | — | | ++++ | ++++ | +++ | ++++ | ++++ | ++++ |
| 22 | cyclohexyl- | 2 | — | | ++++ | ++++ | ++++ | ++++ | ++++ | ++++ |
| 23 | phenyl- | 2 | — | | ++++ | ++++ | ++++ | ++++ | ++++ | ++++ |
| 24 | 4-methoxybenzyl- | 2 | — | | ++++ | ++++ | +++ | ++++ | ++++ | ++++ |
| 25 | 2-nitro-4-methylphenyl- | 2 | — | | ++++ | ++++ | ++++ | ++++ | ++++ | ++++ |
| 26 | blank | 0 | blank | 0 | 0 | 0 | 0 | 0 | 0 | 0 |

TRADEMARK AND SUPPLIER
[1]Amicals, Abbott Labs.
[2]Silbersiegel
[3]Zineb, Maneb, Montedison
[4]Mylone, Union Carbide
[6]Fluka CH

TABLE III

| paste no. | (a) | (b) | (c) | total active material in paste (%) | molar equiv. val. ratio of a : b | grams paste added |
|---|---|---|---|---|---|---|
| 1 | 4.22 | 0.76 | 2.7 | 64.84 | 1 : 0.5 | 3.64 |
| 2 | 4.22 | 1.52 | 3.2 | 64.20 | 1 : 1 | 4.24 |
| 3 | 4.22 | 2.29 | 3.5 | 65.03 | 1 : 1.5 | 4.74 |
| 4 | 4.22 | 2.75 | 3.8 | 64.72 | 1 : 1.8 | 5.10 |
| 5 | 4.22 | 3.05 | 4.0 | 64.39 | 1 : 2.0 | 5.34 |
| 6 | 4.22 | 3.66 | 4.5 | 63.65 | 1 : 2.4 | 5.87 |
| 7 | 4.22 | 6.10 | 6.0 | 63.24 | 1 : 4.0 | 7.73 |

An acrylic latex paint for exterior use was prepared according to the recipe given in Example 1A.

To 100 gram samples each of the above acrylic latex paint were added the amounts of pastes 1 to 7 listed in Column 7 of Table III, thus resulting in a constant concentration of 2 percent 4-tolyldiiodomethyl sulfone in all 7 test paints. As in Example 1A the relatively high dosage was chosen to make yellowing effects more apparent.

The paint samples were again applied to glass plates, dried, exposed and evaluated exactly in the same manner as described in Example 1A. The results are listed in Table IV.

EXAMPLE 2B 4.22 grams (0.01 mole) of 4-tolyldiiodomethyl sulfone, mp. 148° C. and 3.05 grams (0.01 mole or 0.02 mole equivalents of reactive sulfide group) of zinc-N,N-dimethyldithiocarbamate were placed in a rotating mixing drum and drymixed for 5 minutes.

Then 169 grams of natural stone granulate were added and mixing was continued for another 15 minutes to equally coat the granulate with the antimicrobial composition.

42 grams of an acrylate latex binder, prepared according to the following recipe

| Acronal 290 D (50% in water) | 76 parts |
|---|---|
| Tylose MH 1500 | 0.5 parts |
| Water | 19.5 parts |
| Texanol | 4.0 parts |
| | 100.0 parts | were then added to the drum and mixing continued for another 15 minutes.

The dosage of 4-tolyldiiodomethyl sulfone was therefore 2 percent by weight and that of zinc-N,N-dimethyldithio carbamate 1.44 percent, corresponding to a molar equivalent ratio of 1:2.

In the same manner plaster samples were prepared using the amounts of 4-tolyldiiodomethyl sulfone (a) and zinc-N,N-dimethyldithiocarbamate (b) listed in Columns 2 and 3 of Table III.

The 7 plaster samples were applied to concrete panels dried, exposed and evaluated exactly as described in Example 1C. The results are listed in Table IV.

TABLE IV

| Molar Equivalent Ratio | Exterior Paint Example 2 A after | | Plaster Example 2 B after | |
|---|---|---|---|---|
| | 2 mths. | 4 mths. | 2 mths. | 4 mths. |
| 1:0.5 | + | ++ | + | ++ |
| 1:1 | 0 | + | + | ++ |
| 1:1.5 | 0 | 0 | 0 | + |
| 1:1.8 | 0 | 0 | 0 | 0 |
| 1:2.0 | 0 | 0 | 0 | 0 |
| 1:2.4 | 0 | 0 | 0 | 0 |
| 1:4.0 | 0 | 0 | 0 | 0 |

The results with combinations of 4-tolyldiiodomethyl sulfone and zinc-N,N-dimethyldithiocarbamate in these two coating materials show that, although a certain anti-yellowing effect is already visible at low molar equivalent ratios, ratios of at least 1:1.5 in case of Example 2A and 1:1.8 in case of Example 2B are needed to give a perfect result over the long weathering period. Higher ratios do not yield visible improvements in this particular case.

The following example illustrates the synergistically increased activity resulting from combinations of diiodomethyl sulfones with dithiocarbamates in comparison with the individual substances.

EXAMPLE 3A 11.06 grams (0.025 mole) of 4-chlorophenyldiiodomethylsulfone and 9.86 grams (0.055 mole) of sodium-N,N-dimethyl-dithiocarbamate were placed in a laboratory ball mill and ground for 1 hour. 19.32 grams of a light yellow fine powder were obtained, containing the two products in a molar ratio of 1:2.2 and labelled test product No. 3.

In axactly the same manner the mixtures listed in Table V were prepared using the amounts indicated and yielding test products containing diiodomethylsulfone and dithiocarbamate in a constant molar equivalent ratio of 1:2.2.

TABLE V

| Test Product No. | Diiodomethyl sulfone | Grams | Dithiocarbamate | Grams |
|---|---|---|---|---|
| 4 | 4-tolyl | 10.55 | Na-N,N-dimethyl- | 9.86 |
| 5 | 4-chlorophenyl | 11.06 | Zn-N,N-dimethyl- | 8.41 |
| 6 | 4-tolyl | 10.55 | Zn-N,N-dimethyl- | 8.41 |
| 7 | 4-chlorophenyl | 11.06 | di Na-N,N'-ethylene-bis | 7.05 |
| 8 | 4-tolyl | 10.55 | di Na-N,N'-ethylene-bis- | 7.05 |
| 9 | 4-chlorophenyl | 11.06 | Zn-N,N'-ethylene-bis- | 7.58 |
| 10 | 4-tolyl | 10.55 | Zn-N,N'-ethylene-bis- | 7.58 |
| 11 | 4-chlorophenyl | 11.06 | Mn-N,N'-ethylene-bis- | 7.30 |
| 12 | 4-tolyl | 10.55 | Mn-N,N'-ethylene-bis- | 7.30 |
| 13 | 4-chlorophenyl | 11.06 | Zn-N,N'-propylene-bis- | 7.97 |
| 14 | 4-tolyl | 10.55 | Zn-N,N'-propylene-bis- | 7.97 |
| 15 | 4-chlorophenyl | 11.06 | S-benzyl-N,N-dimethyl- | 11.62 |
| 16 | 4-tolyl | 10.55 | S-benzyl-N,N-dimethyl- | 11.62 |
| 17 | 4-chlorophenyl | 11.06 | tetramethylthiuramdisulfide | 6.61 |
| 18 | 4-tolyl | 10.55 | tetramethylthiuramdisulfide | 6.61 |
| 19 | 4-chlorophenyl | 11.06 | 3,5-dimethyl-1,3,5-2H-tetrahydrothiadiazine-2-thione | 8.93 |

TABLE V-continued

| Test Product No. | Diiodomethyl sulfone | Grams | Dithiocarbamate | Grams |
|---|---|---|---|---|
| 20 | 4-tolyl | 10.55 | 3,5-dimethyl-1,3,5-2H-tetrahydrothiadiazine-2-thione | 8.93 |

100 gram samples of the acrylic latex paint described in Example 1A were placed successively in a Molteni dissolver machine and 0.5 grams of each of the test products No. 3–20 were added and stirred during 5 minutes. 0.5 grams of the individual products No. 1, 2 and 21 to 26 were incorporated in the same manner into 100 gram samples of the acrylic latex paint.

From each paint sample 1 to 26 a paint film was made on pure cellulose filter paper (Schleicher & Schüll No. 604, 10 × 30 cm) with a wet film thickness of 200 $\mu$ (7.88 mils) using a film applicator.

The painted filter paper samples were then left to dry in a dark room for 5 days. Then the filter paper samples were cut in half. One half of each paper was artificially weathered using the following procedure. First, the painted filter paper was placed in a bath and washed in an immersed state during 24 hours with running tap water.

Then the painted filter paper was hung into a hot air chamber and treated with a stream of air of 65° C. for 24 hours. From the unweathered and weathered painted filter papers discs of 17 mm diameter were cut out.

Agar test plates were prepared as follows: Petri dishes of 95 mm diameter were charged with 17.5 ml each per dish of hot malt agar nutrient under sterile conditions. After cooling and gelling, 5 ml of malt agar containing $10^6$ spores per ml was poured into each dish as a second layer containing the inoculum.

The test organisms, *cladosporium sphaerospermum* (C.S.) and *trichorderma viride* (T.V.) were used in two parallel test series.

The filter paper discs were placed centrally into the Petri dishes. The dishes were incubated in a climatized room at 25° C. and 80–90 percent relative humidity for 21 days. After the incubation period the test plates were evaluated by measuring the inhibition zones in millimeters. The results recorded in Table VI represent therefore the distance in mm between the edge of the filter paper disc and the inner limit of growth of the test organism. An 0 indicates that no inhibition zone was existing or, additionally, that the organism had invaded the disc.

TABLE VI

| no. | (a) -diiodomethyl- sulfone | (b) -dithiocarbamate | exterior paint Example 3 A | | | | interior paint Example 3 B | | | |
|---|---|---|---|---|---|---|---|---|---|---|
| | | | C.U. unw. | w. | T.V. unw. | w. | C.S. unw. | w. | T.V. unw. | |
| 1 | 4-chlorophenyl- | | 7 | 3 | 5 | 2 | 9 | 4 | 4 | 1 |
| 2 | 4-tolyl- | | 5 | 3 | 4 | 2 | 6 | 4 | 5 | 3 |
| 3 | 4-chlorophenyl- | Na-N,N-dimethyl- | 10 | 0 | 8 | 0 | 10 | 2 | 8 | 1 |
| 4 | 4-tolyl- | Na-N,N-dimethyl- | 8 | 0 | 6 | 0 | 9 | 2 | 7 | 3 |
| 5 | 4-chlorophenyl- | Zn-N,N-dimethyl- | 10 | 5 | 9 | 5 | 10 | 6 | 8 | 6 |
| 6 | 4-tolyl- | Zn-N,N-dimethyl- | 10 | 6 | 11 | 5 | 11 | 7 | 10 | 6 |
| 7 | 4-chlorophenyl- | di-Na-N,N'-ethylene-bis-[1] | 14 | 0 | 14 | 0 | 13 | 0 | 14 | 1 |
| 8 | 4-tolyl- | di-Na-N,N'-ethylene-bis- | 14 | 0 | 8 | 0 | 15 | 2 | 9 | 2 |
| 9 | 4-chlorophenyl- | Zn-N,N'-ethylene-bis- | 10 | 3 | 8 | 1 | 11 | 4 | 7 | 1 |
| 10 | 4-tolyl- | Zn-N,N'-ethylene-bis- | 11 | 2 | 8 | 2 | 10 | 2 | 10 | 3 |
| 11 | 4-chlorophenyl- | Mn-N,N'-ethylene-bis- | 8 | 4 | 8 | 3 | 10 | 6 | 10 | 4 |
| 12 | 4-tolyl- | Mn-N,N'-ethylene-bis- | 9 | 4 | 5 | 0 | 11 | 5 | 7 | 1 |
| 13 | 4-chlorophenyl- | Zn-N,N'-propylene-bis-[2] | 5 | 0 | 3 | 0 | 7 | 2 | 4 | 1 |
| 14 | 4-tolyl- | Zn-N,N'-propylene-bis- | 4 | 0 | 2 | 0 | 3 | 1 | 5 | 0 |
| 15 | 4-chlorophenyl- | S-benzyl-N,N-dimethyl- | 6 | 1 | 3 | 0 | 8 | 1 | 4 | 0 |
| 16 | 4-tolyl- | S-benzyl-N,N-dimethyl- | 5 | 0 | 4 | 1 | 7 | 0 | 6 | 3 |
| 17 | 4-chlorophenyl- | tetramethylthiuramdisulfide | 13 | 4 | 10 | 3 | 13 | 5 | 9 | 4 |
| 18 | 4-tolyl- | tetramethylthiuramdisulfide | 12 | 5 | 9 | 3 | 11 | 7 | 10 | 5 |
| 19 | 4-chlorophenyl- | 3.5-dimethyl-1.3.5-2H-tetrahydrothiadiazine-2-thione | 20 | 15 | 18 | 14 | 22 | 18 | 21 | 17 |
| 20 | 4-tolyl- | 3.5-dimethyl-1.3.5-2H-tetrahydrothiadiazine-2-thione | 19 | 16 | 17 | 13 | 20 | 15 | 20 | 16 |
| 21 | — | Na-N,N-dimethyl- | 0 | 0 | 0 | 0 | 1 | 0 | 0 | 0 |
| 22 | — | Zn-N,N-dimethyl- | 0 | 0 | 0 | 0 | 1 | 0 | 0 | 0 |
| 23 | — | di-Na-N,N'-ethylene-bis- | 1 | 0 | 0 | 0 | 1 | 0 | 0 | 0 |
| 24 | — | Zn-N,N'-ethylene-bis- | 2 | 1 | 0 | 0 | 2 | 1 | 1 | 0 |
| 25 | — | tetramethylthiuramdisulfide | 4 | 1 | 2 | 0 | 6 | 3 | 4 | 1 |
| 26 | — | 3.5.-dimethyl-1.3.5-2H-tetrahydrothiadiazine-2-thione | 3 | 0 | 3 | 1 | 7 | 1 | 5 | 0 | unw. = unweathered
w. = weathered
[1] Nabam, Montedison
[2] Propineb, Bayer

EXAMPLE 3B

The same experiment was carried out exactly according to the description of Example 3A, but using the polyvinylacetate paint described in Example 1B.

The results of Examples 3A and 3B are listed in Table VI.

Table VI clearly demonstrates the synergistic effects of biocidal activity of the combination of diiodomethyl sulfones and dithiocarbamates when comparing results of combined compounds with those of individual compounds in the unweathered columns. The smaller inhibition zones recorded in the weathered columns are caused mainly by extraction during the weathering treatment in the water bath, and therefore are an indication of extractability of the antimicrobial compounds when used in the 2 particular coatings of Examples 3A and 3B. It can be seen that several combinations, e.g. Nos. 5, 6, 19 and 20 give very good to excellent results.

The following Example 4 illustrates a typical method of antimicrobial application in a commercial white paint and the superior behavior with regard to non-yellowing. Examples 1A, 1B and 1C illustrate the methods of separate addition of compounds (a) and (b) at two different stages of coating material preparation, while Example 2A illustrates the preparation and application of a paste. Furthermore, Example 2B demonstrates the preparation and application by a dry-premix. Following Examples 4, 5 and 6 illustrate the preparation of solutions and the methods of application of such solutions.

EXAMPLE 4

15 grams of 4-tolyldiiodomethyl sulfone and 10.4 grams of 3,5-dimethyl-1,3,5-2H-tetrahydrothiadiazine-2-thione were dissolved in 74.6 grams of N-methylpyrrolidone by gently warming to 35° C. The solution was filtered; it contains the diiodomethyl sulfone and the 3,5-dimethyl-1,3,5-2H-tetrahydrothiadiazine-2-thione in a molar equivalent ratio of 1:1.8 (solution 4-1).

1.2 percent of this solution, representing 0.3 percent of total active material or 0.18 percent of 4-tolyldiiodomethyl sulfone was added to a commercial white latex paint, based on an acrylic binder (disperdan Daniel) by simple stirring. A wooden test panel A, 40 × 60 centimeter, was painted with one brush coat of the paint and fixed vertically to a wall facing west.

A parallel experiment was carried out by dissolving 15 grams of 4-tolyldiiodomethyl sulfone in 85 grams of N-methylpyrrolidone. Again 1.2 percent of this solution (solution 4-2) representing 0.18 percent of 4-tolyl-diiodomethyl sulfone (as above) was added to another sample of the same paint. An identical test panel B was prepared and exposed as above. A control panel C was equally exposed.

After 2 days only, panel B showed already a visible yellowing, whereas panel A was unchanged. After 3 months there was no visible color difference between panel A and the control C, whereas panel B had strongly discolored. Dark spots due to beginning fungal invasion were visible on panel C, while both panels A and B were clean.

The following example demonstrates the non-yellowing behavior of such an antimicrobial composition on textiles such as white canvas, and the method of application in form of a solution in a commercial impregnating product.

EXAMPLE 5

To 50 grams of solution 4-1, described in Example 4, 10 grams of a commercial emulsifier (Sermul, Servo NL) was added and mixed (solution 5-1).

50 grams of solution 5-1 was incorporated into 400 grams of a commercial water-proofing impregnating agent (Zimpragnin, Zimmerli CH), using an ancre stirrer (composition 5-2).

An impregnating bath using 60 grams of composition 5-2 per liter was prepared and white cotton canvas pieces measuring 60 × 60 cm were treated according to the directions for use of the impregnating agent producer.

Exactly the same procedure as described above was carried out starting with solution 4-2 of Example 4.

The canvas were exposed to weathering and evaluated for color after 6 months. The canvas treated with 4-tolyldiiodomethyl sulfone alone had yellowed to scale ++++ whereas canvas treated with composition 5-2 showed only slight yellowing to scale +.

The use and method of application of such an anti-yellowing microbiocidal composition in form of a solution in an organic solvent type coating material is illustrated in the following example.

EXAMPLE 6

To a commercial colorless wood lacquer finish (Tisch-Finish, St. Margrethen CH) was added 1.75 percent of solution 4-1 and of solution 4-2 respectively, described in Example 4. Wooden boards (Swiss spruce) were lacquered using 150 grams of lacquer per square meter of surface. The boards were placed indoors under a window with West exposure. After a year a difference was clearly visible. The boards treated with lacquer containing solution 4-2 (4-tolyl-diiodomethyl sulfone alone) were darker.

The results of Examples 4, 5 and 6 clearly show the superiority of combined diiodomethyl sulfone and dithiocarbamate in commercial coating compositions as compared with diiodomethyl sulfone alone.

This invention has been disclosed with respect to certain preferred embodiments, and it will be understood that modifications and variations thereof will become obvious to persons skilled in the art and are intended to be included within the spirit and purview of this application and the scope of the appended claims.

What is claimed is:

1. In a method for protecting a host material against attack by micro-organisms comprising coating said host material with a diiodomethyl sulfone of the formula $R(CH_2)_nSO_2CHI_2$, wherein $n$ is an integer from 0 to 4 and R is selected from the group alkyl, cycloalkyl, phenyl, naphthyl, monoloweralkylphenyl, polyloweralkylphenyl, loweralkoxyphenyl, monohalophenyl, polyhalophenyl, haloloweralkylphenyl, halonitrophenyl, nitrophenyl, nitroloweralkylphenyl, anilino, anilinophenyl and anilamidophenyl, the improvement comprising admixing with said sulfone a sufficient amount of a compound containing a reactive sulfide or sulfhydryl group to prevent the changing in color of the diiodomethyl sulfone.

2. The method of claim 1 wherein the compound containing a reactive sulfide or sulfhydryl group is represented by the general formula $R_9$—S—X, wherein X is selected from the group consisting of hydrogen, $R_9$—S— and $R_9$—, and $R_9$ is selected from the group consisting of hydrogen, an equivalent of a metal and an organic radical.

3. The method of claim 1 wherein the compound containing a reactive sulfide or sulfhydryl group is represented by the formula:

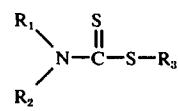

wherein $R_1$ is selected from the group consisting of hydrogen and lower alkyl, $R_2$ is selected from the group consisting of hydrogen, lower alkyl, a residue of the general formula:

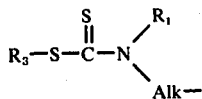

wherein Alk represents an alkylene group having 1 to 6 carbon atoms and a residue of the formula:

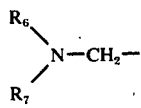

wherein $R_6$ is selected from the group consisting of hydrogen, loweralkyl and hydroxyloweralkyl and $R_7$ is selected from the group consisting of hydrogen, loweralkyl and hydroxyloweralkyl or wherein $R_1$ and $R_2$ together with the nitrogen atom to which they are attached form a heterocyclic ring having 4 to 6 carbon atoms, and $R_3$ is selected from the group consisting of hydrogen, an equivalent of a metal atom, a group $R_8$—, $R_8CH_2$— or $R_8$—S—, wherein $R_8$ is an organic radical or wherein $R_3$ and $R_7$ together represent a methylene bridge.

4. The method of claim 3 where Alk repesents an alkylene group having 2 to 3 carbon atoms and $R_8$ is:

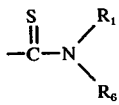

5. The method of claim 1 wherein the compound containing a reactive sulfide or sulfhydryl group is a dithiocarbamate.

6. The method of claim 5 wherein the dithiocarbamate is an alkali metal, zinc or manganese salt of an N,N-diloweralkyldithiocarbamate or an alkali metal, zinc or manganese salt of an alkylene bis (dithiocarbamate) having 2 to 6 carbon atoms in the alkylene group.

7. The method of claim 5 wherein the dithiocarbamate is a compound of the formula:

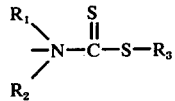

where $R_1$ is hydrogen or alkyl of 1 to 4 carbon atoms, $R_2$ is alkyl of 1 to 4 carbon atoms and $R_3$ is hydrogen, an alkali metal, zinc, manganese or hydrocarbyl.

8. The method of claim 1, wherein the compound containing a reactive sulfide or sulfhydryl group is zinc-N,N'-ethylenebis-(dithiocarbamate).

9. The method of claim 1, wherein the compound containing a reactive sulfide or sulfhydryl group is tetramethylthiuramdisulfide.

10. The method of claim 1, wherein the compound containing a reactive sulfide or sulfhydryl group is zinc-N,N'-propylene-1,2-bis-dithiocarbamate).

11. The method of claim 1, wherein the compond containing a reactive sulfide or sulfhydryl group is 3,5-dimethyl-1,3,5-2H-tetrahydrothiadiazine-2-thione.

12. The method of claim 1, wherein the compound containing a reactive sulfide or sulfhydryl group is zinc-N,N-dimethyldithiocarbamate.

13. In an antimicrobial composition adapted to protect a host material against attack by micro-organisms, said composition comprising a diiodomethyl sulfone of the formula $R(CH_2)_nSO_2CHI_2$, wherein $n$ is an integer from 0 to 4 and R is selected from the group alkyl, cycloalkyl, phenyl, naphthyl, monoloweralkylphenyl, polyloweralkylphenyl, loweralkoxyphenyl, monohalophenyl, polyhalophenyl, haloloweralkylphenyl, halonitrophenyl, nitrophenyl, nitroloweralkylphenyl, anilino, anilinophenyl and anilamidophenyl, the improvement comprising a sufficient amount of a compound containing a reactive sulfide or sulfhydryl group to prevent the changing in color of the diiodomethyl sulfone.

14. The composition of claim 13 wherein the compound containing a reactive sulfide or sulfhydryl group is represented by the formula $R_9$—S—X wherein X is selected from the group consisting of hydrogen, $R_9$—S— and $R_9$—, and $R_9$ is selected from the group consisting of hydrogen, an equivalent of a metal and an organic radical.

15. The composition of claim 13 wherein the compound containing a reactive sulfide or sulfhydryl grop is represented by the formula:

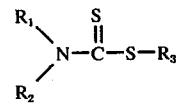

wherein $R_1$ is selected from the group consisting of hydrogen and lower alkyl, $R_2$ is selected from the group consisting of hydrogen, lower alkyl, a residue of the general formula:

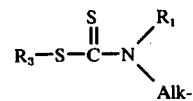

where alk represents an alkylene group having 1 to 6 carbon atoms and a residue of the formula:

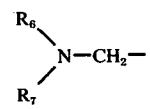

wherein $R_6$ is selected from the group consisting of hydrogen lower alkyl and hydroxy lower alkyl and $R_7$ is selected from the group consisting of hydrogen, lower alkyl and hydroxy lower alkyl wherein $R_1$ and $R_2$ together with the nitrogen atom to which they are attached form a heterocyclic ring having 4 to 6 carbon atoms and $R_3$ is selected from the group consisting of hydrogen, an equivalent of a metal, a group $R_8$—, $R_8CH_2$—or $R_8$—S—, wherein $R_8$ is an organic radical, or wherein $R_3$ and $R_7$ together represent a methylene bridge.

16. The composition of claim 15 wherein Alk represents an alkylene group having 2 to 3 carbon atoms and $R_8$ is

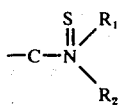

17. The composition of claim 13 where *n* is 0 or 1.

18. The composition of claim 13 wherein the compound containing a reactive sulfide or sulfhydryl group is a dithiocarbamate.

19. The composition of claim 18 wherein the dithiocarbamate is an alkali metal, zinc or manganese salt of an N,N-di lower alkyl dithiocarbamate or an alkali metal, zinc or manganese salt of an alkylene bis (dithiocarbamate) having 2 to 6 carbon atoms in the alkylene group.

20. The composition of claim 18 wherein the dithiocarbamate is a compound of the formula:

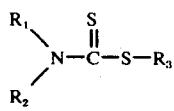

wherein $R_1$ is hydrogen or alkyl of 1 to 4 carbon atoms, $R_2$ is alkyl of 1 to 4 carbon atoms and $R_3$ is hydrogen, an alkali metal, zinc, manganese or hydrocarbyl.

21. The composition of claim 18 wherein the dithiocarbamate is tetramethylthiuramdisulfide.

22. The composition of claim 18 wherein the dithiocarbamate is zinc-N,N'-ethylene-bis-(dithiocarbamate).

23. The composition of claim 18 wherein the dithiocarbamate is zinc-N,N-propylene-1,2-bis-(dithiocarbamate).

24. The composition of claim 18 wherein the dithiocarbamate is 3,5-dimethyl-1,3,5-2H-tetrahydrothiadiazine-2-thione.

25. The composition of claim 18 wherein the dithiocarbamate is zinc-N,N-dimethyldithiocarbamate.

26. The composition of claim 13 wherein the compound containing a reactive sulfide or sulfhydryl group is an inorganic sulfide.

27. The composition of claim 13 wherein the compound containing a reactive sulfide or sulfhydryl group is present in a molar equivalent ratio of 1 mole diiodomethyl sulfone to 0.5 to 4 moles of the compound containing a reactive sulfide or sulfhydryl group.

28. The composition of claim 27 wherein the molar equivalent ratio is 1 mole of diiodomethyl sulfone to 1.8 to 2.4 moles of the compound containing a reactive sulfide or sulfhydryl group.

29. The composition of claim 28 wherein the molar equivalent ratio is 1 mole diiodomethyl sulfone to approximately 2 moles of the compound containing a reactive sulfide or sulfhydryl group.

30. The composition of claim 13 comprising from about 0.05 to 2% by weight of the total of the diiodomethyl sulfone and the compound containing a reactive sulfide or sulfhydryl group, the balance being a microbiocidally inert carrier.

31. The antimicrobial composition according to claim 30 suitable to protect a textile host from micriorganisms wherein the carrier is a volatile solvent.

32. The composition according to claim 30, wherein the carrier is a latex paint.

33. A composition according to claim 30 wherein the carrier is a plaster.

34. An industrial material comprising a potential host for attack by micro-organisms having at least a portion of its surface in contact with the antimicrobial composition according to claim 13 whereby said host is rendered resistant to attack by a micro-organism.

35. An industrial material according to claim 34, wherein the potential host is cotton fabric.

36. An industrial material according to claim 34 wherein the potential host is a paint film and its supporting substrate.

37. An industrial material according to claim 34, wherein the potential host is a plaster and its supporting substrate.

* * * * *